Jan. 6, 1953  G. C. COLBURN ET AL  2,624,266
PASTEURIZING APPARATUS

Filed Nov. 7, 1946  2 SHEETS—SHEET 1

INVENTOR.
GEORGE C. COLBURN
CHESTER W. TURNER
BY Jenney & Hildreth
ATTORNEYS

Jan. 6, 1953 G. C. COLBURN ET AL 2,624,266
PASTEURIZING APPARATUS
Filed Nov. 7, 1946 2 SHEETS—SHEET 2

INVENTOR.
GEORGE C. COLBURN
CHESTER W. TURNER
BY Jenney & Hildreth
ATTORNEYS

Patented Jan. 6, 1953

2,624,266

UNITED STATES PATENT OFFICE 2,624,266

PASTEURIZING APPARATUS

George C. Colburn, South Natick, and Chester W. Turner, Melrose, Mass., assignors to H. E. Wright Company, Charlestown, Mass., a corporation of Massachusetts Application November 7, 1946, Serial No. 708,296

1 Claim. (Cl. 99—252)

The present invention relates to pasteurizing apparatus and more particularly to apparatus for pasteurizing small quantities of liquid such as milk.

The primary object of the present invention is to provide a simple and inexpensive apparatus for pasteurizing liquids, whereby small quantities of liquid may be safely and accurately pasteurized.

With this object in view the principal features of this invention comprises a unit for pasteurizing liquid in the ultimate containers. One of the containers is adapted to receive a thermostat whereby the actual pasteurizing temperature within the containers is indicated. The containers are placed in a bath which is heated to a controlled temperature. The thermostat in the container is used to initiate a timing cycle whereby maintenance of all of the liquid at pasteurizing temperature for the required period is assured. Thus for milk, pasteurization at 143° F. for at least 30 minutes is required and a pasteurizing cycle which assures those conditions is initiated when the temperature reaches that value. At the conclusion of the cycle a valve is operated automatically to pass cold water through the system to cool the bottles.

Figure 1:
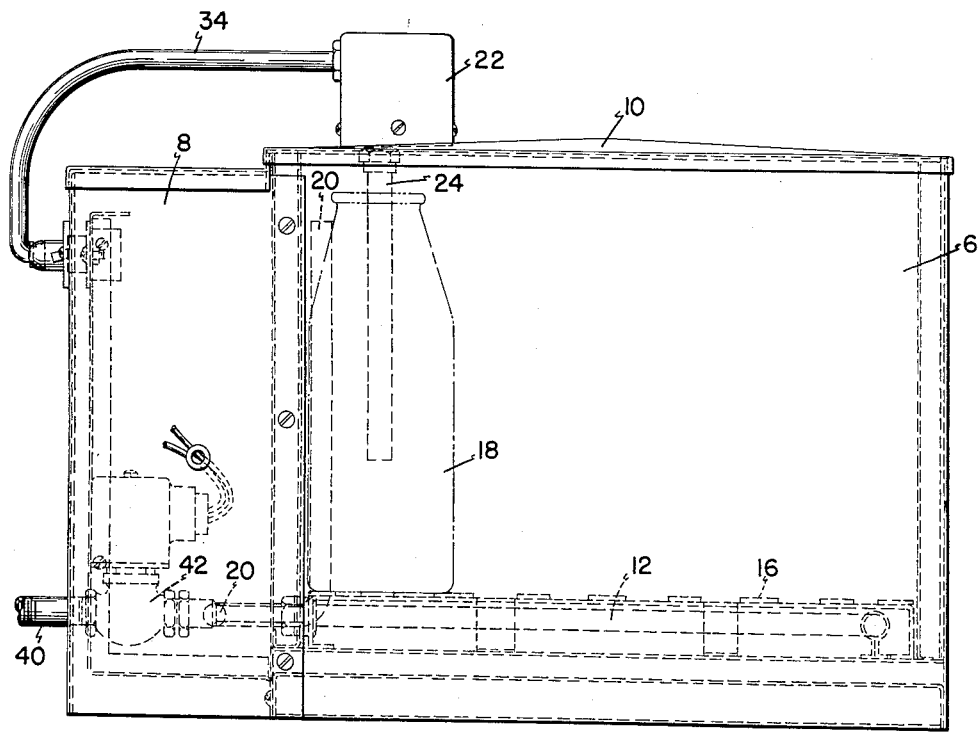
Figure 2:
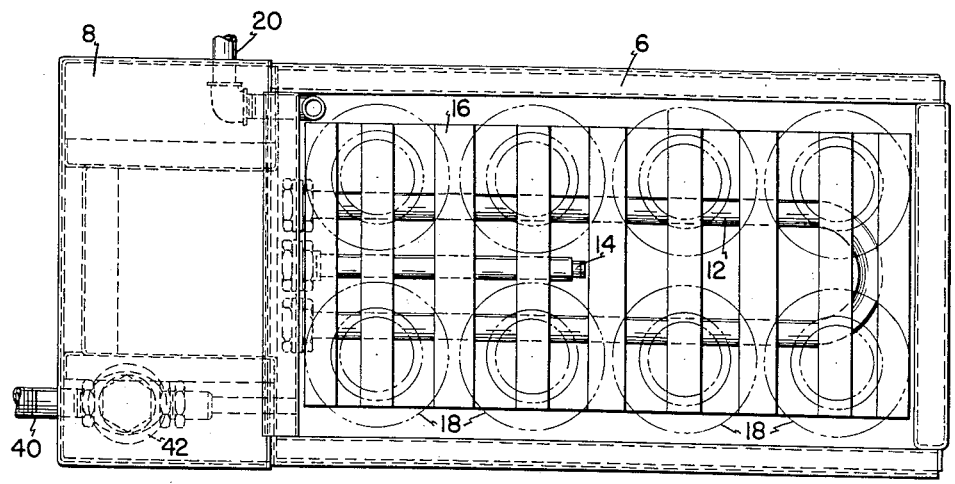
Figure 3:
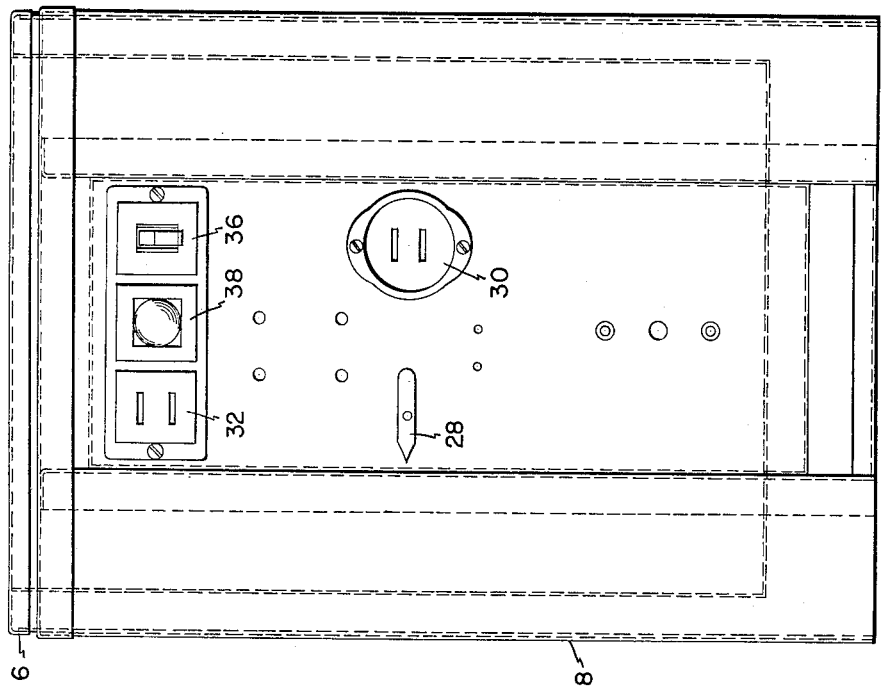
Figure 4:
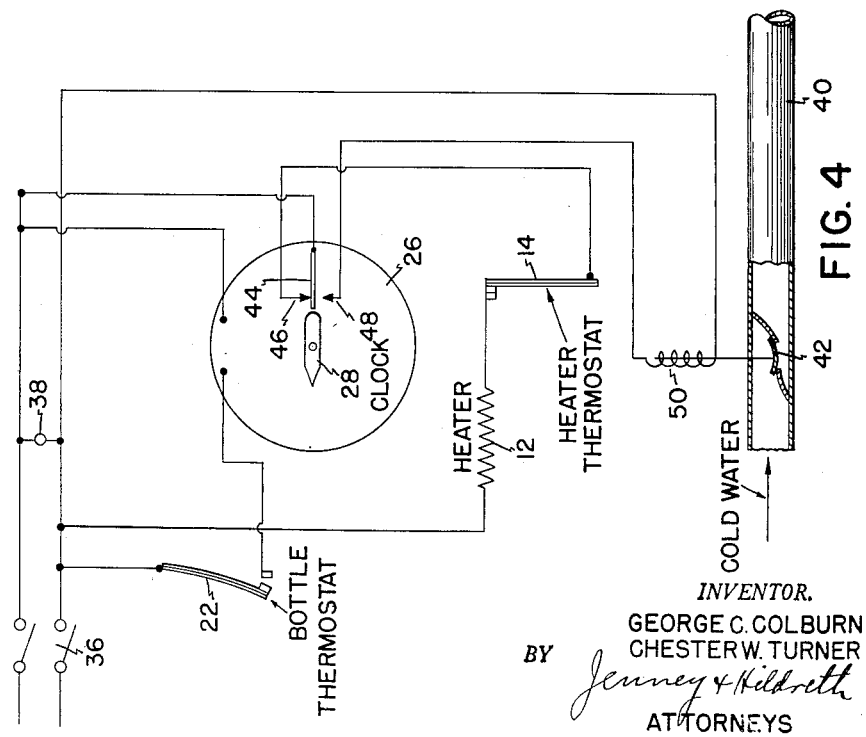

In the accompanying drawings, Fig. 1 is a sectional elevation of a pasteurizer embodying the features of the invention; Fig. 2 is a plan view with the cover removed; Fig. 3 is an end elevation; and Fig. 4 is a wiring diagram of the equipment.

The pasteurizer shown in the drawings comprises a tank 6 having suitably insulated bottom and side walls. The tank herein shown is adapted to receive eight bottles although it may be of a size to accommodate any desired number. At one end of the tank is mounted a control box 8 to be later described. A cover 10 is provided for the top of the tank.

An electric heating unit 12 and a control thermostat 14 extend from the control box 8 into the tank. The thermostat 14 is responsive to the temperature of the water in the tank. In the bottom of the tank is a removable rack 16 on which the containers are supported.

As herein shown, the containers comprise glass milk bottles 18 of usual form. An overflow pipe 20 is provided at one corner of the tank and extends to a level just below the mouths of the bottles.

Mounted on the cover 10 is a thermostatic unit 22 having a rod shaped element 24 adapted to be inserted into one of the bottles. Preferably the bottle in which the thermostat is inserted is filled with water, the remaining seven bottles being filled with milk. In the pasteurizing operation the tank is first filled with water and the bottles are placed in the tank, the level of the water being determined by the height of the overflow pipe 20.

The control box 8 encloses an electric clock which is indicated at 26 in the wiring diagram of Fig. 4 and is provided with a manual setting knob 28. A socket 30 is provided for plugging in the main source of current. At the top of the panel is an electrical receptacle 32 to receive a plug at the end of the cable 34 leading from the bottle thermostat 22. A main switch 36 and a pilot light 38 are also provided, the latter being used to indicate when the main switch is closed.

A cold water supply is indicated at 40. The supply leads through a solenoid valve 42 into the tank 6. The valve is operated to turn on a supply of cooling water at the conclusion of the pasteurizing operation.

As shown in the wiring diagram, Fig. 4, the electric supply line runs through the main switch 36. A connection is made from opposite sides of the line through the contacts of the bottle thermostat 22 to the clock 26. The thermostat contacts are arranged to close when the temperature within the bottle reaches pasteurizing temperature (143° F.) whereby the circuit to the clock is closed. The clock is provided with a switch having a movable contact 44 normally closed on a contact 46 which is in series with the heater 12 and the heater thermostat 14. As shown in Fig. 4, when the movable contact 44 is closed on contact 46 there is a circuit through the heater and heater thermostat. The thermostat 14 is adapted to open and close in order to maintain a predetermined temperature in the water which is in the tank surrounding the bottles. The tank temperature will generally be a few degrees above pasteurizing temperature; in the example given, the tank temperature will be about 149° F.

The clock is so arranged that when the knob is moved a certain distance (corresponding, for example, to a time of one-half hour), the movable contact 44 which is normally in engagement with the contact 46 is moved toward a contact 48. Contact 46 is in series with the heater 12 and the thermostat 14, and contact 48 is in series with the solenoid 50 of the solenoid valve 42.

To operate the apparatus, the operator fills the tank with water and then places the bottles in the tank. As heretofore noted, seven bottles will be filled with milk and the eighth bottle will preferably be filled with water. The cover 10 is placed on the tank and the bottle thermostat 24 enters the bottle of water. A suitable source is plugged in at 30, the clock knob 28 is set to the position of Fig. 3, and the main switch 36 is closed. The heater 12 heats up and is controlled by the thermostat 14 so that a temperature of about 149° F. is reached and maintained in the tank. The clock does not start until the bottle thermostat 22 reaches pasteurizing temperature (143° F.). Thus the timing of the pasteurizing cycle does not begin until there is assurance that the liquid within the bottles has actually reached pasteurizing temperature. On closure of the bottle thermostat contacts the clock starts. After pasteurization for a half-hour, the movable contact 44 is operated to open the circuit to the heater, and moved to engage the contact 48 which closes a circuit to the solenoid 50. Thus at the conclusion of the timed pasteurizing cycle the heater is shut off and cold water is introduced into the tank. The cold water overflows through the overflow pipe 20 and hence does not enter the bottles.

It will be observed that the electric clock 26, being of the self-starting type, will operate only when the bottle thermostat allows the circuit to be closed. Thus if the bottle temperature drops below 143° F. for any cause, the clock will stop and will not restart until the bottle temperature again rises to 143° F. Thus the clock measures the total pasteurizing time at the desired temperature.

Having thus described the invention, we claim:

Pasteurizing apparatus comprising a bottle receiving tank, a dummy bottle positioned in said tank, a water bath contained in said tank and surrounding said dummy bottle, a cover for said tank, a first thermostat mounted on said cover so as to be immersed in the liquid in said dummy bottle when said cover is positioned on said tank, a thermostatically controlled heating unit in the bottom of the tank immersed in said water bath, a bottle supporting rack removably positioned on the bottom of said tank above said heating unit for supporting the dummy bottle and individual bottles of liquid to be pasteurized, a valve-controlled water inlet for said tank, an overflow pipe extending upwardly from the bottom of the tank to a point adjacent the top of the tank to limit the water level in said tank, a timing device in circuit with said first thermostat, said first thermostat closing the circuit to said timing device when the liquid in said dummy bottle is at pasteurizing temperature, and connections between the timer, the heater and the valve-controlled water inlet for turning off the heater and for admitting cooling water to the tank upon the completion of a predetermined period of timer operation.

GEORGE C. COLBURN.
CHESTER W. TURNER.

REFERENCES CITED

The following references are of record in the file of this patent:

UNITED STATES PATENTS

| Number | Name | Date |
|---|---|---|
| 475,122 | Kramer | May 17, 1892 |
| 907,639 | Paul | Dec. 22, 1908 |
| 1,951,396 | Corbett | Mar. 20, 1934 |
| 1,996,625 | Pendleton | Apr. 2, 1935 |
| 2,001,344 | Fielder | May 14, 1935 |
| 2,149,542 | Peltz | Mar. 7, 1939 |
| 2,321,235 | Olson | June 8, 1943 |
| 2,436,585 | Mangold | Feb. 24, 1948 |